Sept. 3, 1968 P. W. AGNEW 3,399,600
APPARATUS FOR TRACING THE CONTOUR OF A SHAPED MEMBER
Filed April 20, 1966 3 Sheets-Sheet 3
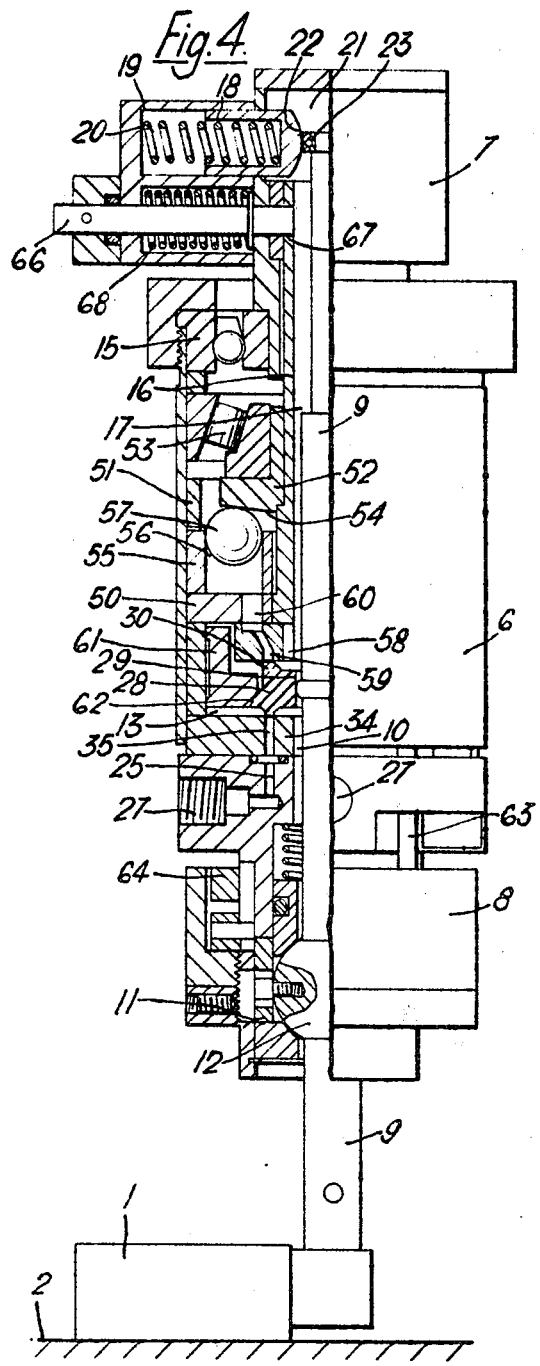
Inventor
PATRICK WILLIAM AGNEW
By Mason, Fenwick & Lawrence
Attorneys United States Patent Office 3,399,600
Patented Sept. 3, 1968

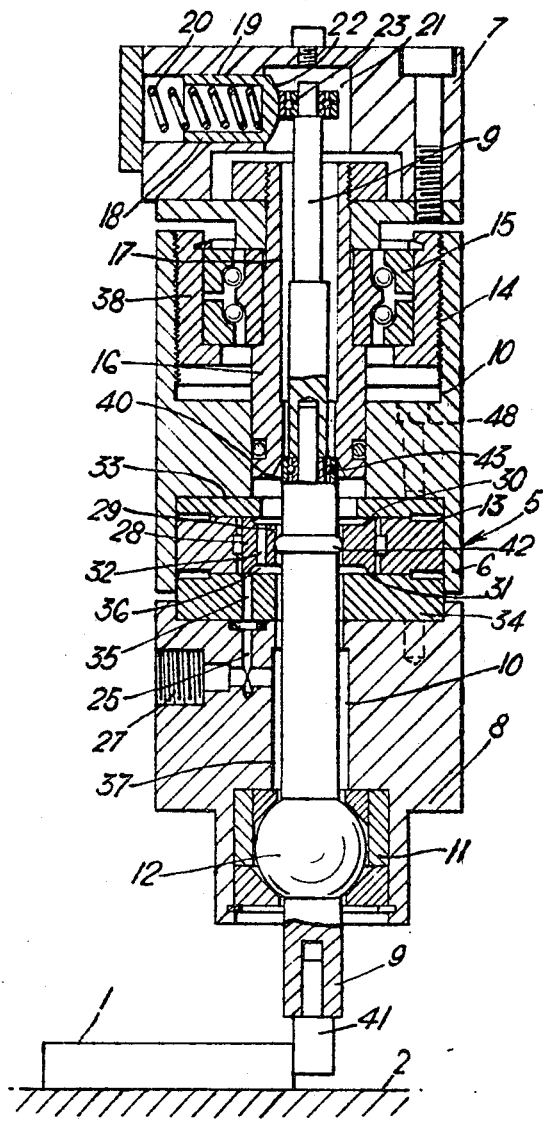

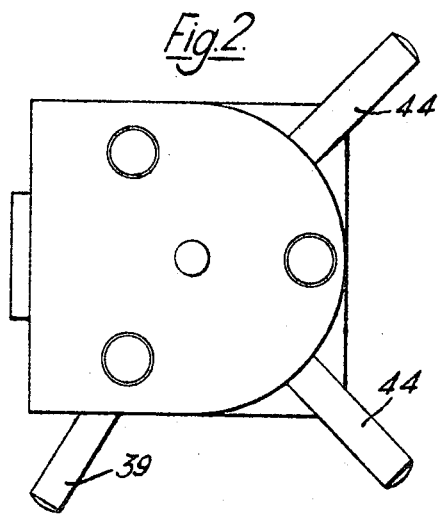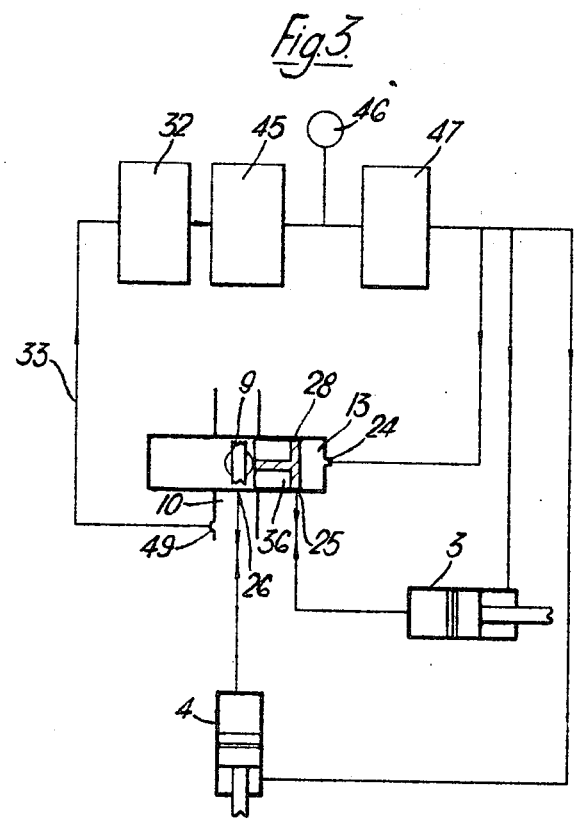

3,399,600
APPARATUS FOR TRACING THE CONTOUR OF A SHAPED MEMBER
Patrick William Agnew, Carmunnock, Glasgow, Scotland, assignor to Precision Hydraulics Limited, Glasgow, Scotland, a British company
Filed Apr. 20, 1966, Ser. No. 543,847
Claims priority, application Great Britain, Apr. 24, 1965, 17,381/65; Oct. 30, 1965, 46,021/65
7 Claims. (Cl. 90—62)

ABSTRACT OF THE DISCLOSURE

The present invention is apparatus for use in following or tracing the contour of a shaped member including a platform adapted to mount a shaped member, a feeler adapted to engage said shaped member, first means for moving said feeler within a carrying head containing it to tend to maintain it in engagement with the shaped member, and second means for moving said platform in a path to trace the contour of the shaped member, the feeler being coupled to a single valve in a pressure fluid line to the two piston and cylinder devices whereby movement of the feeler causes corresponding movement of the valve to control the flow of pressure fluid to the piston and cylinder devices thus to control movement of the platform.

---

This invention relates to apparatus for use in following or tracing the contour of a shaped member.

According to the present invention there is provided apparatus including a platform adapted to mount a shaped member, a feeler adapted to engage said shaped member, first means for moving said feeler within a carrying head containing it to tend to maintain it in engagement with the shaped member, and second means for moving one of said platform and said head in a path to trace the contour of the shaped member, the operation of said second means being controlled by the aforesaid movement of said feeler within said head.

Preferably the second means is adapted to move the platform.

Preferably also said second means comprises two pressure fluid operated piston and cylinder devices coupled to the platform for movement of the platform respectively in directions at right angles to each other within the plane of the platform.

The feeler may be mounted in a rotatable housing and may be spring-urged against the shaped member and means may be provided automatically, or under manual control, to rotate said housing to maintain the feeler in engagement with the shaped member as the platform is moved.

The feeler may be coupled to a single valve in a pressure fluid line to the two piston and cylinder devices whereby movement of the feeler causes corresponding movement of the valve to control the flow of pressure fluid to the piston and cylinder devices thus to control movement of the platform.

Means may be provided for rotating automatically the housing comprising an hydraulic motor, of the swash plate and axial piston or eccentric and radial piston type, having a cylinder block fixed rigidly in the carrying head relative to the rotatable housing and having at least three cylinders each provided with a piston, the swash plate or eccentric of said motor being attached to said housing to cause rotation of the housing, and the supply of fluid to said motor cylinders being the same as the supply to the piston and cylinder devices and being controlled by the same single valve as the supply to said devices.

Preferably the motor cylinders are symmetrically disposed with respect to the axis of the carrying head.

Means may be provided also for controlling the freedom of the feeler to depart from a predetermined position said means comprising a bearing member arranged to abut a protrusion from the feeler, and being adjustably mounted within the carrying head.

Preferably that part of the bearing member against which the protrusion from the feeler abuts has an inverted frusto-conical surface.

One embodiment of the present invention will now be described by way of example with reference to the accompanying drawings in which:

FIG. 1 shows a sectional elevation of a tracing head,
FIG. 2 shows a plan view of the tracing head shown in FIG. 1,
FIG. 3 shows diagrammatically an hydraulic circuit for the tracing head shown in FIG. 1 and FIG. 2, and
FIG. 4 shows an elevation of a modified tracing head in part sectional elevation.

This embodiment relates to the machining of metal workpiece to the shape of a pre-shaped template.

A template 1 is attached to a movable platform 2 for example the sub-table of a milling machine, the table being mounted on two horizontal cross slides (not shown), at right angles to each other so that the table 2, and the template 1, can move alternatively or simultaneously in two directions, the slides restraining the table against rotation. Motion of the table is controlled by means of two double acting pressure fluid operated piston and cylinder devices 3 and 4 (FIG. 3) or any other suitable type of motor element, mounted to operate along the axis of the aforementioned slides respectively.

The table 2 also mounts the workpiece to be machined, a milling or cutting tool being mounted to operate on to the workpiece so that as the table and the workpiece move in a path tracing the contour of the template, the workpiece will be moved about the tool and machined to the same contour (neither the workpiece nor the tool being shown).

A feeler or stylus carrying head 5 is positioned above the template 1. This head may be mounted on another part of the machine and may conveniently be mounted on a bracket (not shown) separate from the machine. The head comprises a main body portion 6 of square cross-section, an upper housing 7 rotatably mounted on the main body portion, and means for supporting the feeler 9 within the main body portion.

The main body portion 6 is provided with an axial through passage 10, in which is secured, near its lower end, a sleeve 11 having a spherical seat bearing for housing a ball 12 attached to the feeler 9 such that a ball and socket support is provided for the feeler.

Approximately intermediate the top of the main body portion 6 and the socket means (11, 12) the through passage 10 enlarges to form a first annular chamber 13 and a further annular enlargement 14 is provided over the top third of the passage.

A bearing 15 is accommodated in the top enlargement 14 and rotatably supports a guide 16 which has a central bore 17 into which the top of the feeler 9 extends, the guide being free to rotate relative to the main body portion. The guide 16 is rigidly attached to the upper rotatable housing 7 and a slide 18, located in a guideway 19 formed in the housing, is urged by a spring 20 into contact with the feeler 9, the guideway extending radially from the bore 21 of the housing which is co-axial with the bore 10 of the main body portion 6. The slide is provided at its inner end with a part-spherical surface 22 for contact, at a point, with the top of the feeler 9 which is provided with a ball bearing 23.

The annular chamber 13 is provided with one radial port 24 to which pressure fluid is fed and two axial ports 25, 26 (FIG. 3) which communicate with passages, only one of which, 27, is shown, in the main body portion, each of these passages leading to one of the pressure fluid operated piston and cylinder devices 3, 4. The axial ports 25, 26 are arranged on the same circumference and are spaced apart by 90°.

Located in this chamber 13 is a disc valve member 28 which is free to move to a certain extent in a horizontal plane. The valve member 28 has an axial passage 29 therethrough, raised edges 30, 31 at its circumference on both sides, and also has holes 32 drilled on its plate between the raised edges 30, 31 and central passage 29, the mean radius of the raised portion being such that when the valve is concentrically positioned with respect to the annular chamber then the raised portions of the valve seat against the inner faces of two annular discs 33, 34 fixed in the chamber 13 above and below the valve member 28, the lower disc 34 being provided with two axial ports 35 in alignment with the passages 25, 26, and cover the axial ports 35. Should the valve be displaced radially then one or both of the axial ports 35 will be partially or completely uncovered to enable the flow of pressure fluid between the chamber 13 and the respective main piston and cylinder device 3 or 4 or between the piston and cylinder device and the space 36 inside the raised edges 30, 31 of the valve member 28, this space being connected to the fluid reservoir 32 by a line 33 leading from a radial outlet 49 (FIG. 3) in the part of the through passage below the annular enlargement, the fluid reservoir being at or near to atmospheric pressure.

To facilitate the assembly of the discs 33, 34 the main body portion is split transversely into two parts, an upper part and a lower part 8 which is fixed to the upper part by bolts 48.

Means for controlling the freedom of the feeler to depart from a vertical position is located in the upper enlargement 10 of the through passage of the main body portion 6 and comprises a threaded collar 38 screw threaded into the main body portion 6 and attached to the bearing 15, such that by rotating collar 38 by traversing a lever 39 protruding through the housing, the guide 16 is raised or lowered. The bore 17 of the guide 16 is enlarged at its lower end such that is has an inverted frusto-conical surface 40.

The feeler 9 is essentially a rod having a tip 41 at one end, said end projecting downwards towards the movable table 2 and bearing against the periphery of the template 1. A first spherical, or approximately spherical portion 12 of the feeler seats in the spherical seat bearing 11, or equivalent mechanism which forms a universal pivot point for the feeler 9. A second spherical portion 42 of the feeler engages the axial hole 29 in the disc valve 30 so that pivotal movement of the feeler about the ball and socket joint 11, 12 results in a horizontal deflection of the disc valve, and the aforementioned spring loaded slide 18 engages with the ball bearing 23 at the top of the feeler.

A second ball bearing 43 is provided on the feeler intermediate the second spherical portion 42 and the top of the feeler such that said protrusion may abut the inverted frusto-conical surface 40 of the guide 16.

FIG. 3 illustrates diagrammatically the hydraulic circuit, only part of the main body portion being shown. The fluid in the reservoir 32, which is at or near atmospheric pressure is pressurised by a pump 45 which may be electrically driven and may be bypassed by a relief valve (not shown). Pressurised fluid from the pump 45 passes by way of a gauge 46 and a filter 47 to the piston and cylinder devices 3 and 4 and to the annular chamber 13 by way of radial port 24. Fluid returning from the piston and cylinder devices 3 and 4 flows by way of ports 25, 26, space 36, outlet 49, and line 33 back to the reservoir 32.

In operation the guide 16 which, at this stage, is in its lowest position is holding the feeler 9 in its vertical position since the frustro-conical bore 40 of said member is abutting the second ball bearing 43 on the feeler to prevent movement of the feeler. By traversing the lever 39 the threaded collar 38 engaging with the bearing 15 is rotated thus raising the guide 16 such that the feeler 9 is allowed a restricted freedom of movement, the amount of freedom being dependent on the height to which the guide 16 is raised.

The spring urged slide 18 at the top of the feeler will then cause the feeler to move from its vertical position and this will cause the disc valve 28 to move in such a way that the respective axial ports 35 are either open or closed and hydraulic fluid is directed to the respective main piston and cylinder devices 3 or 4 which moves the table, and by manual rotation of the housing 7 by means of the levers 44 the table may be caused to move so as to bring the template into contact with the feeler. If the upper rotatable housing 7 is then turned such that the force exerted by the spring urged slide 18 is at approximately 45° to the surface of the template 1 at the point of contact of the feeler 9 the main piston and cylinder devices 3, 4 will cause the table 2 to move in a direction parallel to the periphery of the template at the point of contact with the feeler. Any movement of the table and thus the template other than in this direction, will cause a displacement of the disc valve 30 such as to pass pressure fluid to the respective main piston and cylinder devices 3, 4 to provide corrective table movement.

To ensure continuous movement of the feeler tip 41 relative to the template 1, the operator rotates the upper housing 7 such that the feeler tip 41 is always urged against the template by the spring 20 and such that the feeler 9 is always urged such that the disc valve uncovers the port 25 associated with the main piston and cylinder device controlling the movement of the table 2 in a direction across the feeler, to ensure continuous movement of the template 1 across the feeler tip. To aid the operator two levers 44 are provided protruding from the main housing.

Since the freedom of the stylus 9 to depart from the vertical position is restricted by the guide 16 the table 2 will travel at a velocity determined by the height to which said guide is raised and in a direction determined by the point at which the ball bearing 43 on the feeler touches the guide, and by the relative positions of the housing and the point at which the feeler touches the template.

Since the spring load from the slide 18 is disposed at approximately 45° to the tangent at the point of contact of the feeler 9 with the template 1, the feeler tip 41 is simultaneously urged towards the template and also in a direction opposite to the direction of feed. This ensures that if a re-entrant corner comes against the feeler tip and the direction of spring loading is not rotated the spring 20 will be compressed so as to restore the feeler 9 to a vertical position, and the table 2 will come to rest and the machining head will not damage the work-piece.

In a modification of the above-described embodiment the rotation of the housing 7 is achieved automatically. The apparatus is basically similar to that described in FIGS. 1, 2 and 3 and the parts common to each embodiment have been referenced similarly and need no further description. The modification is illustrated in FIG. 4.

The top half of the main body portion of the modification is provided with an enlarged bore and a portioning plate 50 having a central through passage for the feeler 9 divides this enlarged bore into the annular chamber 13 and a motor chamber 51.

Located within the motor chamber 51 is an hydraulic swash plate motor, the swash plate 52 of the motor being rigidly attached to the guide 16 approximately intermediate its ends. The swash plate 52 is rotatably supported within the main body portion 6 by a tapered roller bearing 53, the eccentric plane face 54 of the swash plate facing downwards.

The cylinder block 55 for the swash plate motor rests on plate 50 and is provided with at least three cylinders 56 the axes of which are parallel to the main body longitudinal axis, and are symmetrically disposed with respect to said axis. The upper end of the cylinders are open and the lower ends are each provided with a port. The cylinders are each provided with a piston which takes the form of a ball 57 whose diameter is a close fit in the cylinder diameter.

Rigidly attached to the lower end of the guide 16 is a valve plate 58 provided with two axial ports 59, the upper end of said ports communicating with kidney-shaped ports 60 formed in said portioning plate 50, and the lower ends with the first annular chamber 13.

The raised edge 30 of the valve member 28 normally covers the lower end of the axial ports 59. However, should the valve be displaced radially then not only will the axial ports 35 in the lower disc 34 be partially or completely uncovered but so also will the corresponding ports 59 of the valve plate 58 be uncovered enabling flow of pressure fluid to the respective cylinders 56 of the swash plate motor.

In the modification the freedom of movement of the valve member 28 is determined by a collar 61 housed within the chamber 13 and provided with a frusto-conical enlargement 62 at the lower end of its bore. The collar 61 is raised to allow the valve member 28 which has a corresponding frusto-conical surface some freedom of movement by raising the collar by means of two diametrically opposite vertical rods 63 attached to the underside of the collar 61 and abutting a ring 64 which is pivoted on a thrust ring 65 attached within the lower part 8 of the main body portion. The ring 64 is provided with two diametrically opposed pivots (not shown) balancing on the thrust ring 65, the pivots being spaced exactly between the two rods 63. With this arrangement the horizontal disposition of the collar is ensured.

In addition to the spring urged slide 18, the rotatable housing 7 is provided with a spring loaded plunger 66, the axis of which is perpendicular to the axis of the main body portion. This plunger engages with a hole 67 or slot in the aforementioned tube 16, so that when it is allowed to protrude into the bore of the housing under the influence of the spring 68, it locks the housing 7 to the tube, and thereby causes rotation of the hydraulic swash plate motor to cause rotation of the rotatable housing, and therefore of the direction of spring loading of the stylus 9. The tube 16 is provided with at least two holes 67 or slots each of which is angled at approximately 45° to the axis of symmetry of the swash plate 52, one for tracing templates in a clockwise direction, and one for tracing templates in an anti-clockwise direction. When the spring loaded plunger 66 is held out against the resistance of the spring 68, the rotatable housing 7 is disengaged from the tube 16, and may be rotated by hand, in order to bring the template 1 up to the stylus 9 and start the motion of the table in the required direction, or manually to control the direction of feed for any other purpose.

In operation of the modification with the housing 7 locked to the tube 16 by the plunger 66, the rotation of the housing 7 to keep the spring force of spring 20 acting on the feeler 9 at 45° to the tangent at the point of contact of the feeler with the template, the modification functions similarly to the above-described embodiment, movement of the valve member 28 uncovering the ports 35 to permit fluid flow to or from the piston and cylinder devices 3 and 4, the direction of flow depending on whether the raised edge 31 of the valve member 28 is moved outwards or inwards.

The ports 59 on the valve plate 58 will also be exposed and there will consequently be a flow of fluid to or from the pistons 56 of the hydraulic swash plate motor. This flow will cause movement, up or down, of the ball pistons 57 and, due to the eccentricity of the swash plate 52, it will rotate at the same time rotating the valve plate 58, and the housing 7, thus altering the line of action of the spring force on the slide 18 and on the feeler top. Rotation will continue until both ports 59 of the valve plate 58 are equally exposed to the pressure area, this only occurring when the line joining the centres of the ports 59 is at right angles to the line joining the longitudinal axis of the body portion to the centre of the valve member 28. The direction of the slide's spring force on the feeler will thus be maintained at 45° to the periphery of the template at the point of contact of the feeler 9.

It will be realised that although the movement of the table and the rotation of the housing have been described separately in practice both occur simultaneously and the periphery of the template moves continuously round the feeler, the motion being transmitted to the table moving the workpiece relative to the tool.

In further modifications, the pressure fluid operated piston and cylinder devices and auxiliary equipment may be replaced by electric position pick-offs, amplifiers, and electric or electro-hydraulic actuators, or by other servo-mechanisms.

Furthermore, by rearrangement of the parts of the apparatus it may be arranged that the table and template are urged into contact with the feeler and the feeler is moved around the template periphery.

I claim:

1. Apparatus for use in following or tracing the contour of a shaped member including a platform adapted to mount a shaped member, a feeler adapted to engage said shaped member, first means for moving said feeler within a carrying head containing it to tend to maintain it in engagement with the shaped member, and second means for moving said platform in a path to trace the contour of the shaped member, the feeler being coupled to a single valve in a pressure fluid line to the two piston and cylinder devices whereby movement of the feeler causes corresponding movement of the valve to control the flow of pressure fluid to the piston and cylinder devices thus to control movement of the platform.

2. Apparatus as claimed in claim 1, in which the single valve includes a chamber having parallel facing faces and a member slidably mounted between said faces, said member being movable by the feeler and having a through passage, first pressure fluid ports communicating with the chamber and the through passage respectively in all positions of said member, and second fluid ports in one of the facing faces separately closable by said member and in communication with said piston and cylinder devices whereby said devices are adapted to communicate with said pressure fluid ports depending on the position of the member.

3. Apparatus as claimed in claim 2, in which restraint means is provided for controlling the freedom of the feeler to depart from a predetermined position said restraint means comprising an annular bearing member having an inverted frusto-conical bore, being adjustably mounted within the carrying head and arranged to abut the outer face of the slidably mounted member which has a corresponding frusto-conical surface.

4. Apparatus as claimed in claim 1, in which the means for rotating automatically the housing comprises an hydraulic motor, of the swash plate and axial piston or eccentric and radial piston type, having a cylinder block fixed rigidly in the carrying head relative to the rotatable housing and having at least three cylinders each provided with a piston, the swash plate or eccentric of said motor being attached to said housing to cause rotation of the housing, and the supply of fluid to said motor cylinders being the same as the supply to the piston and cylinder devices and being controlled by the same single valve as the supply to said devices.

5. Apparatus as claimed in claim 4, in which the motor cylinders are symmetrically disposed with respect to the axis of the carrying head.

6. Apparatus for use in following or tracing the contour of a shaped member including a platform adapted to mount a shaped member, a feeler adapted to engage said shaped member, first means for moving said feeler within a carrying head containing it to tend to maintain it in engagement with the shaped member, and second means for moving said platform in a path to trace the contour of the shaped member, said first means comprising an hydraulic motor of the swash plate and axial piston or eccentric and radial piston type, having a cylinder block fixed rigidly in the carrying head relative to the rotatable housing and having at least three cylinders each provided with a piston, the swash plate or eccentric of said motor being attached to said housing to cause rotation of the housing and the supply of fluid to said motor cylinders being the same as the supply to the piston and cylinder devices and being controlled by a single valve as the supply to said devices.

7. Apparatus as claimed in claim 6, in which the motor cylinders are symmetrically disposed with respect to the axis of the carrying head.

References Cited

UNITED STATES PATENTS

| 2,788,718 | 4/1957 | Martellotti | 90—62 |
| 2,841,356 | 7/1958 | Glaser | 90—62 |
| 3,114,295 | 12/1963 | Ronner et al. | 90—62 |

FOREIGN PATENTS 678,777   1/1964   Canada.

GERALD A. DOST, *Primary Examiner.*